United States Patent
Koo

(10) Patent No.: US 10,713,071 B2
(45) Date of Patent: Jul. 14, 2020

(54) METHOD AND APPARATUS FOR NETWORK FUNCTION VIRTUALIZATION

(71) Applicant: KT Corporation, Seongnam-si (KR)

(72) Inventor: Bum-Mo Koo, Seongnam-si (KR)

(73) Assignee: KT Corporation, Seongnam-si (KR)

( * ) Notice: Subject to any disclaimer, the term of this patent is extended or adjusted under 35 U.S.C. 154(b) by 173 days.

(21) Appl. No.: 15/176,761

(22) Filed: Jun. 8, 2016

(65) Prior Publication Data

US 2016/0366014 A1 Dec. 15, 2016

(30) Foreign Application Priority Data

Jun. 9, 2015 (KR) ........................ 10-2015-0081417

(51) Int. Cl.
*G06F 15/167* (2006.01)
*G06F 9/455* (2018.01)
*H04L 12/46* (2006.01)
*H04L 12/24* (2006.01)

(52) U.S. Cl.
CPC ...... *G06F 9/45558* (2013.01); *H04L 12/4641* (2013.01); *H04L 41/0813* (2013.01)

(58) Field of Classification Search
CPC . H04L 41/0803; H04L 12/4641; H04L 63/10; H04L 41/0813; G06F 9/45558; H06F 2009/45595
See application file for complete search history.

(56) References Cited

U.S. PATENT DOCUMENTS

| | | | | |
|---|---|---|---|---|
| 9,430,262 | B1* | 8/2016 | Felstaine | G06F 9/45558 |
| 2011/0209145 | A1* | 8/2011 | Chen | G06F 9/45558 718/1 |
| 2013/0060946 | A1* | 3/2013 | Kenneth | G06F 12/0866 709/226 |
| 2013/0308641 | A1* | 11/2013 | Ackley | H04L 45/7457 370/392 |

(Continued)

FOREIGN PATENT DOCUMENTS

| | | |
|---|---|---|
| JP | 2002-368743 A | 12/2002 |
| JP | 2015-056182 A | 3/2015 |
| KR | 10-1453154 B1 | 10/2014 |

OTHER PUBLICATIONS

European Telecommunications Standard Institute (ETSI) Industry Specifications Group (ISG) Network Function Virtualization (NFV); Infrastructure Overview. ETSI GS NFV-INF 001 V1.1.1 (Jan. 2015). (Year: 2015).*

*Primary Examiner* — Chris Parry
*Assistant Examiner* — Stephen J Houlihan
(74) *Attorney, Agent, or Firm* — Sughrue Mion, PLLC

(57) ABSTRACT

A method and an apparatus for network function virtualization, which may allow services of VNF components logically and physically distributed in a VNF instance to be shared with another VNF instance in a NFV environment without any separate component such as a load balancer. The method for network function virtualization includes: configuring one or plural virtual network function (VNF) instances including one or plural shared virtual network function (VNF) components and one or plural VNF instances including one or plural non-shared VNF components, generating a descriptor including attribute information of the one or plural shared VNF components, and providing the descriptor to a VNF instance which is to use the shared VNF component.

23 Claims, 14 Drawing Sheets

(56) References Cited

U.S. PATENT DOCUMENTS

| | | | |
|---|---|---|---|
| 2015/0063166 A1* | 3/2015 | Sif | G06F 9/45533 370/254 |
| 2015/0082308 A1 | 3/2015 | Kiess et al. | |
| 2015/0143471 A1 | 5/2015 | Kim et al. | |
| 2016/0139962 A1* | 5/2016 | Tsirkin | G06F 9/5088 718/1 |
| 2016/0180063 A1* | 6/2016 | Bhandaru | G06F 21/105 726/26 |
| 2016/0337329 A1* | 11/2016 | Sood | H04L 63/08 |

* cited by examiner

FIG. 8A

| Client VNF | VNFCD | Domain | IP/Port | Access Time |
|---|---|---|---|---|
| VNF Z | VNFCD#10 | SKT.co.kr | 171.25.10.100/80 | 70 Hour |
| VNF Y | VNFCD#40 | KT.com | 10.214.50.11/80 | 70 Hour |
|  | VNFCD#71 | KT.com | 10.214.55.20/80 | – |
| VNF X | VNFCD#50 | KT.com | 10.214.70.12/80 | 12 Days |
|  | VNFCD#21 | KT.com | 10.217.50.8/80 | 12 Days |

FIG. 9A

| Client VNF | VNFCD | Domain | IP/Port | Access Time | |
|---|---|---|---|---|---|
| VNF Z | ~~VNFCD#10~~ | ~~SKT.co.kr~~ | ~~171.25.10.100/80~~ | ~~70 Hour~~ | Delete |
| VNF Y | ~~VNFCD#40~~ | ~~KT.com~~ | ~~10.214.50.11/80~~ | ~~70 Hour~~ | Delete |
| | VNFCD#71 | KT.com | 10.214.55.20/80 | – | |
| VNF X | VNFCD#50 | KT.com | 10.214.70.12/80 | 12 Days | |
| | VNFCD#21 | KT.com | 10.217.50.8/80 | 12 Days | |

METHOD AND APPARATUS FOR NETWORK FUNCTION VIRTUALIZATION

CROSS REFERENCE TO RELATED APPLICATIONS

The present application claims the benefit of foreign priority from Korean Patent Application No. 10-2015-0081417 filed on Jun. 9, 2015 with the Korean Intellectual Property Office, the disclosure of which is incorporated herein by reference in its entirety.

BACKGROUND

1. Field

Exemplary embodiments broadly relate to a network function virtualization (NFV) technology, and more particularly, to a method and an apparatus for network function virtualization, which shares a virtual network function (VNF) component in a NFV environment.

2. Description of the Related Art

As Internet is being used more and more, structural problems such as mobility, security, limit in quality guarantee or the like, inherent in the Internet have emerged. To solve the problems, it is demanded to construct a future-oriented network service infrastructure which may allow various future application services to be used rapidly and safely. In this regard, a network function virtualization (NFV) technique is being developed.

The network function virtualization (NFV) is a technique for virtualizing a network function in a software way to control and manage the network function. The NFV separates various functions in the network equipment used by communication service providers and virtualizes the functions to be controlled and managed in a software way. The NFV may be implemented in various ways, and generally, various functions in the network equipment are separated into a large-capacity server, a large-capacity storage device, and a large-capacity switch, located in a data center, so that they may be accessed in a standard way. In addition, a network structure which may allow network functions developed in a software way to be automatically installed at the above devices, operated, and moved, is constructed.

The great advantage obtained by constructing a NFV-based system is that a server resource based on a general-purpose hardware can be virtualized in the form of a virtual machine (VM) and then the VM may be constructed and extended on demand as the quantity of consumed service increases. By doing so, in the fixed communication market, a communication service provider may reduce investment costs in view of CAPEX (Capital Expenditure) and OPEX (Operating Expense) by constructing necessary equipment with the least expense. Further, it is possible to build an environment capable of rapidly coping with various services by means of flexible infrastructure.

On the NFV architecture, a virtual network function (VNF) instance means a network function developed as software for supporting various application programs. For example, the VNF instance may be a media resource function (MRF), a call session control function (CSCF), a home subscriber server (HSS), a packet gateway (P-GW) or the like. In the VNF instance, VNF components which are internal components thereof are assembled to give a VNF service.

For example, when a database system is virtualized, the database system may be briefly composed of three VNF components, namely a VNF component serving as a data server, a VNF component serving as an element manager, and a VNF component serving as a metadata server. The VNF component serving as a data server plays a role of actually storing and managing data, and the VNF component serving as an element manager plays a role of monitoring states of the data server and the metadata server. Also, the VNF component serving as a metadata server manages metadata for the stored data.

Assuming that a network virtualization service of a smallest unit is provided, it may be conceived that all components of a database system, namely three VNF components described above, are loaded in a single VM. In case of a commercial service actually used by millions of users, each VNF component may be independently operated at each VM to enhance processing performance. Since VNF components have different roles and different necessary processing performances, resources such as CPU and memory allocated to VMs in a single physical server (cnode) may be different from each other. In case of a database system, a lot of resources may be allocated to a data server which takes charge of storing and processing data, among VNF components.

When a physical hardware malfunction or a hypervisor malfunction occurs at a physical server, all VMs at the corresponding physical server may be exposed to the malfunction situation. Therefore, as shown in FIG. 12, VMs operating the VNF components are distributed to spaces independent from each other physically (POD) and geographically (for example, Hyehwa, Guro or the like), and dualization is also put into consideration. Seeing the database system such as the one described above, like VNF components in the database system, which are physically and geographically distributed, a lot of VNF instances sharing the corresponding database system and VNF components thereof may also be physically and geographically distributed to prepare for a malfunction.

In such a distributed environment, easy communication, which allows a VNF instance to access a VNF component of another VNF instance, is to place a VNF component having a load balancer function serving as a proxy or a gateway to the front of a VNF instance having a VNF component to be shared. By disposing the VNF component having a load balancer function, another VNF instance need not consider logical and physical conditions of the shared VNF components as well as logical states thereof, but this may be effective only when the number of VNF instances and VNF components thereof is small in the NFV environment or when their physical condition does not change much or remains substantially unchanged. When a commercial service is constructed in the NFV environment, if the load balancer is used, the following issues may occur.

First, the malfunction of the load balancer may lead to a malfunction of a shared VNF instance or the entire service. Therefore, physically distributing the load balancer needs to be considered, and in this case, an optimal arrangement of the load balancer and a routing method needs to be determined. In addition, when the load balancer needs to be balanced, numerous VNF instances need to be notified, and distribute the increased number of load balancers in a satisfactory way should be considered. In addition, when a malfunction occurs at the load balancers, a routing method is needed, and also distribution of loads concentrated on a specific load balancer during this process are also needed.

Another problem in the related art occurs when a shared VNF instance gives a state-based (stateful) service. If consistency needs to be provided for a session, the load balancer should consider a previous state when processing data in response to requests received from VNF components of another VNF instance. This is not an easy problem to solve in a NFV environment in which VMs are extended on demands and also a malfunction may occur at a VM.

In the NFV environment, VNF instances from various providers coexist by using standardized hardware and interface. If numerous shared VNF instances giving services to other VNF instances and providers sharing VNF instances for creating profit, independently develop and provide proxy, load balancer, or the like, investment may be overlapped inefficiently, redundant development may occur, and further activation of NFV may be impeded.

SUMMARY

Exemplary embodiments are designed to solve the problems of the related art, and therefore exemplary embodiments are directed to providing a method and an apparatus for network function virtualization, which may allow services of VNF components logically and physically distributed in a VNF instance to be shared with another VNF instance in a NFV environment. One or more of exemplary embodiments are not required to overcome any of the problems discussed above with respect to related art.

In an aspect of an exemplary embodiment, there is provided a method of network function virtualization, including: configuring one or plural virtual network function (VNF) instance including one or plural shared virtual network function (VNF) component and one or plural VNF instance including one or plural non-shared VNF component; generating a descriptor including attribute information of the one or plural shared VNF component; and providing the descriptor to a VNF instance which is to use the shared VNF component.

The descriptor may be generated for each shared VNF component.

The descriptor may be generated to include attribute information of two or more shared VNF components in a single descriptor.

The descriptor may be generated for each VNF instance including the shared VNF component.

The descriptor provided to a VNF instance may be unique to the corresponding VNF instance.

The method of an exemplary embodiment may further include setting an access authority to the shared VNF component of the VNF instance to which the descriptor is provided.

The access authority may include at least one of a routing policy, a firewall policy, and a security policy.

When a new descriptor to be provided to a VNF instance is overlapped with at least one shared VNF component included in an existing descriptor already provided to the corresponding VNF instance, the provision of the new descriptor to the corresponding VNF instance may be blocked.

The method may further include: when the shared VNF component is changed, transmitting an update command for the corresponding descriptor to the VNF instance to which the descriptor for the corresponding shared VNF component is provided.

The method may further include: when a validity term of the descriptor expires, transmitting a delete command for the corresponding descriptor to the VNF instance to which the corresponding descriptor is provided, and changing an access authority to the shared VNF component.

In yet another aspect of exemplary embodiments, there is provided an apparatus for network function virtualization, including: one or more processors; and a memory coupled the one or more processors, wherein the memory stores program instructions which are executable by the one or more processors to: configure one or plural virtual network function (VNF) instances including one or plural shared virtual network function (VNF) components and one or plural VNF instances including one or plural non-shared VNF components; generate a descriptor including attribute information of the one or plural shared VNF components; and provide the descriptor to a VNF instance which is to use the shared VNF component.

The program instructions may be executable to generate the descriptor for each shared VNF component.

The program instructions may be executable to generate the descriptor to include attribute information of two or more shared VNF components in a single descriptor.

The program instructions may be executable to generate the descriptor for each VNF instance including the shared VNF component.

The descriptor provided to a VNF instance may be unique to the corresponding VNF instance.

The program instructions may be further executable to set an access authority to the shared VNF component of the VNF instance to which the descriptor is provided.

The access authority may include at least one of a routing policy, a firewall policy and a security policy.

When a new descriptor to be provided to a VNF instance is overlapped with at least one shared VNF component included in an existing descriptor already provided to the corresponding VNF instance, the program instructions may be executable to block the provision of the new descriptor to the corresponding VNF instance.

When the shared VNF component is changed, the program instructions may be executable to transmit an update command for the corresponding descriptor to the VNF instance to which the descriptor for the corresponding shared VNF component is provided.

When a validity term of the descriptor expires, the program instructions may be executable to transmit a delete command for the corresponding descriptor to the VNF instance to which the corresponding descriptor is provided, and change an access authority to the shared VNF component.

In another aspect of an exemplary embodiment, there is also provided a system for network function virtualization, including: an apparatus for network function virtualization, which configures one or plural virtual network function (VNF) instances including one or plural shared virtual network function (VNF) components and one or plural VNF instances including one or plural non-shared VNF components; a gateway configured to manage an access of the one or plural peer VNF instances to the one or plural VNF components, where the apparatus for network function virtualization transmits a command for generating a descriptor including attribute information of the one or plural shared VNF components, providing the descriptor to the one or plural peer VNF instances, and setting an access authority to the gateway on the basis of the descriptor.

The gateway may be implemented in the one or plural VNF instances by means of the VNF component.

Exemplary embodiments may prevent a malfunction from occurring in an entire system, when a malfunction occurs at a specific component, by providing a VNF component sharing service without any separate component such as a load balancer.

In addition, exemplary embodiments may reduce investment costs for a gateway device for providing the VNF component sharing service, since the VNF component sharing service may be provided without increasing a load on the gateway even though there is a gateway such as a load balancer.

In addition, exemplary embodiments may allow efficient operation of a shared service since service use range and period may be restricted for each VNF instance using the shared VNF component.

In addition, in exemplary embodiments, the VNF instance using a shared VNF component may use service without any consideration about access authority and firewall required for accessing the shared VNF component.

In addition, in exemplary embodiments, the state of the shared VNF component may be managed in real time and reflected or provided to the entire system, thereby keeping service consistency.

In addition, exemplary embodiments may provide a shared service to some or all VNF components, thereby reducing duplicated development of VNF service, enhancing an available rate of equipment, and creating a profit to providers according to the provision of the shared service.

BRIEF DESCRIPTION OF THE DRAWINGS

The above and/or other aspects will be more apparent by describing certain exemplary embodiments with reference to the accompanying drawings, in which:

FIGS. 8A and 8B and are views showing a process of updating a descriptor in the peer VNF instance according to the change of the shared VNF, according to an exemplary embodiment.

FIGS. 9A and 9B are views showing an update process according to the expiration of an access time of the descriptor according to an exemplary embodiment.

DETAILED DESCRIPTION OF EXEMPLARY EMBODIMENTS

The above aspects, features, and advantages of exemplary embodiments will become more apparent from the following descriptions of exemplary embodiments with reference to the accompanying drawings, from which it will be deemed that a person having ordinary skill can easily practice the technical features of exemplary embodiments. Also, any explanation of the related art known to relate to exemplary embodiments may be omitted if it is regarded to render the subject matter of exemplary embodiments vague. Hereinafter, exemplary embodiments will be described in detail with reference to the accompanying drawings.

Figure 1:
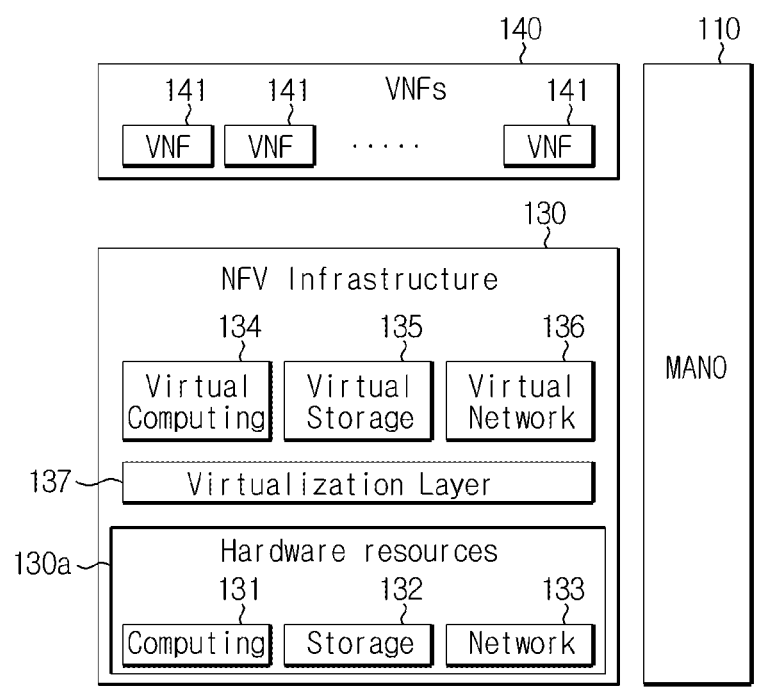
FIG. 1 is a diagram showing a NFV system according to an exemplary embodiment.

FIG. 1 is a diagram showing a NFV system according to an exemplary embodiment. Referring to FIG. 1, the NFV system includes a group 140 of virtual network function (VNF) instances 141, a NFV infrastructure 130, and a management and orchestration (MANO) 110.

The MANO 110 manages and transmits physical and software resource and manages the VNF instance(s) 141. In detail, the MANO 110 manages and controls resources of the NFV infrastructure 130, namely hardware resources 130a including a computing hardware 131, a storage hardware 132 and a network hardware 133, and also performs overall network orchestration and management in a multi NFV infrastructure environment. In addition, the MANO 110 manages a life cycle of the VNF instance(s) 141. In addition, the MANO 110 manages VM resources, routers (or, switches), firewall policy or the like.

The MANO 110 may include an orchestrator, one or more VNF manager, and one or more virtualized infrastructure manager.

The MANO 110 is configured to monitor and manage the VNF instances 141 and the NFV infrastructure 130. The orchestrator may be implemented with the NFV infrastructure 130 and virtual resources in the NFV infrastructure 130. In addition, the orchestrator may realize a network such as L2 and L3 VPN service on the NFV infrastructure 130. The orchestrator may communicate with one or more VNF manager in order to give a request in relation to resources, transmit configuration information to the VNF manager and collect state information of the VNF instance 141. In addition, the orchestrator may communicate with the virtualized infrastructure manager in order to allocate resources, configure virtualized hardware resources and/or preserve and exchange state information. The VNF manager manages one or more VNF instances 141.

The VNF manager performs various management functions such as instantiating, updating, querying, scaling and/or terminating the VNF instance 141. The virtualized infrastructure manager performs management functions used for controlling and managing interactions of the VNF instance 141 to a computing hardware 131, a storage hardware 132, a network hardware 133, a virtual computing 134, a virtual storage 135 and a virtual network 136. For example, the virtualized infrastructure manager performs resource management functions for managing and allocating infrastructure resources and collecting NFV infrastructure malfunction information. The VNF manager and the virtualized infrastructure manager communicate with each other in relation to a resource allocation request and to configure virtualized hardware resources and exchange state information.

The NFV infrastructure 130 includes hardware components, software components, or combinations thereof, for building a virtual environment, and disposing, managing, and executing the VNF instance 141. In other words, in order to provide a virtualized resource such as a VM for the VNF instance 141 or a virtual container of another type, a hardware resource and a virtualization layer 137 are used. The hardware resource includes a computing hardware 131, a storage hardware 132 and a network hardware 133. The computing hardware 131 may be a commercial off-the-shelf (COTS) hardware and/or a custom hardware, used for processing and computing a resource. The storage hardware 132 is provided in a network or gives a storage capacity residing in storage hardware (namely, a local memory located in the server). The network hardware 133 may be a switch, a router, and/or another network device for performing a switching function, which may be connected to each other via a wired or wireless link. The network hardware 133 may lie over several domains and may include a plurality of networks connected to each other through one or more transport network.

The virtualization layer 137 in the NFV infrastructure 130 abstracts the hardware resource, separates the VNF instance 141 from a physical network layer located therebelow, and provides a virtualized resource to the VNF instance 141. As shown in FIG. 1, the virtualized resource includes a virtual computing 134, a virtual storage 135, and a virtual network 136. The virtual computing 134 and the virtual storage 135 may be provided to the VNF instance 141 in the form of a hypervisor, a VM or another virtual container. For example, one or more VNF instance 141 may be disposed at or positioned in a VM. The virtualization layer 137 abstracts the network hardware 133 to form a virtual network. The virtual network includes a VM for hosting the VNF instance 141 and/or and a virtual switch for giving a connection to another virtual container. The hardware resource may be abstracted using various techniques such as virtual LAN, VPLS, VxLAN and NVGRE (Network Virtualization using Generic Routing Encapsulation), without being limited thereto. In addition, the transport network in the network hardware 133 may be virtualized using a central control plane and a separated forwarding plane, for example a software defined network (SDN).

The VNF instance 141 is a group of network functions developed as software to support various application programs and corresponds to each physical network function. For example, the VNF instance 141 may correspond to EPC (Evolved Packet Core), MME, SGW, PGW or the like. The VNF instance 141 is configured with one or plural VNF components, and the VNF component is mounted as one or plural software or VM image.

In an exemplary embodiment depicted in FIG. 1, one or plural VNF instances 141 may be provided, and the VNF instance 141 may include one or plural virtual network function component (VNFC). In addition, in some of the exemplary embodiments, some VNF instances 141 may open one or plural VNF components thereof to other VNF instances 141 so that the service of one or plural corresponding VNF component may be used by other VNF instances 141. This VNF sharing, according to an exemplary embodiment, will be described later in detail with reference to the drawings. In the following description, the VNF component open to and shared by other VNF instances is called a shared VNF component, and the VNF component not shared by other VNF instances is called a non-shared VNF component. In addition, the VNF instance which is to use the shared VNF component is called a peer VNF instance.

Figure 2:
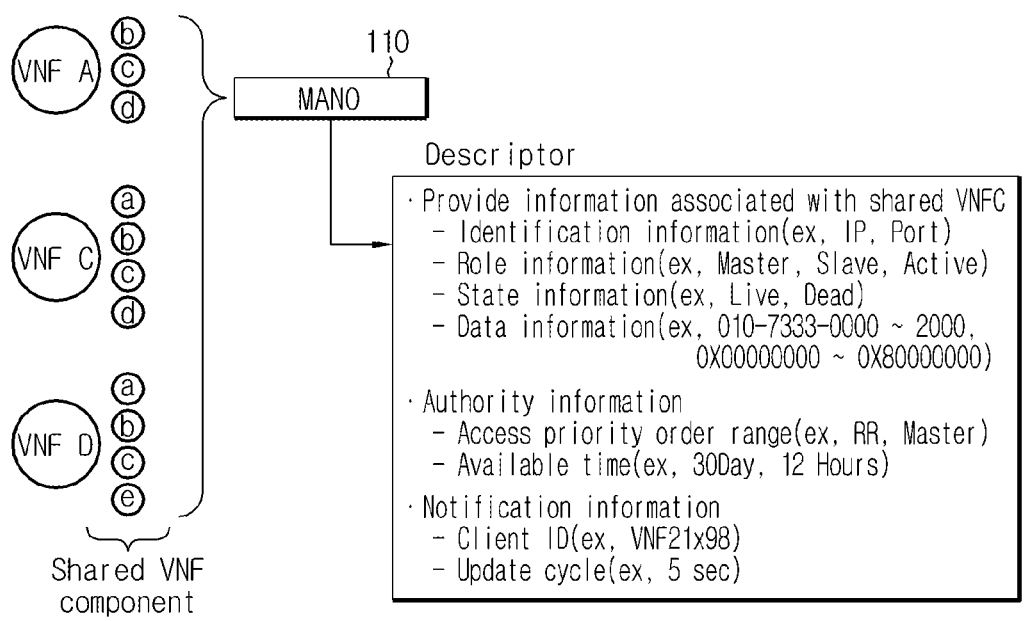
FIG. 2 is a diagram showing information included in a descriptor which represents attribute information of a shared VNF component according to an exemplary embodiment.

FIG. 2 is a diagram showing information included in a descriptor which represents attribute information of a shared VNF component according to an exemplary embodiment.

A provider which is to open and share a VNF component notifies some or all VNF components, which are to be shared, to the MANO 110. The MANO 110 collects logic and physical attribute information of the shared VNF component and generates a descriptor. FIG. 2 shows the attribute information of the shared VNF component, recorded in the descriptor, according to an exemplary embodiment. Referring to FIG. 2, at the descriptor, various attribute information of the shared VNF component is recorded. The attribute information includes, for example, identification information, role information, state information, authority information, notification information, and session information of the VNF component.

The identification information includes an IP address and port of the VNF component. The role information has a relation with a role of the corresponding VNF component and includes a master, a slave, or an active. The state information includes information about whether the corresponding VNF component is in a live state or in a dead state. The authority information includes an access priority order range, an available time or the like. The notification information includes a client ID, an update cycle, or the like. The session information includes a phone number, a session ID, a hash key or the like, managed for each VNF component.

Figure 3:
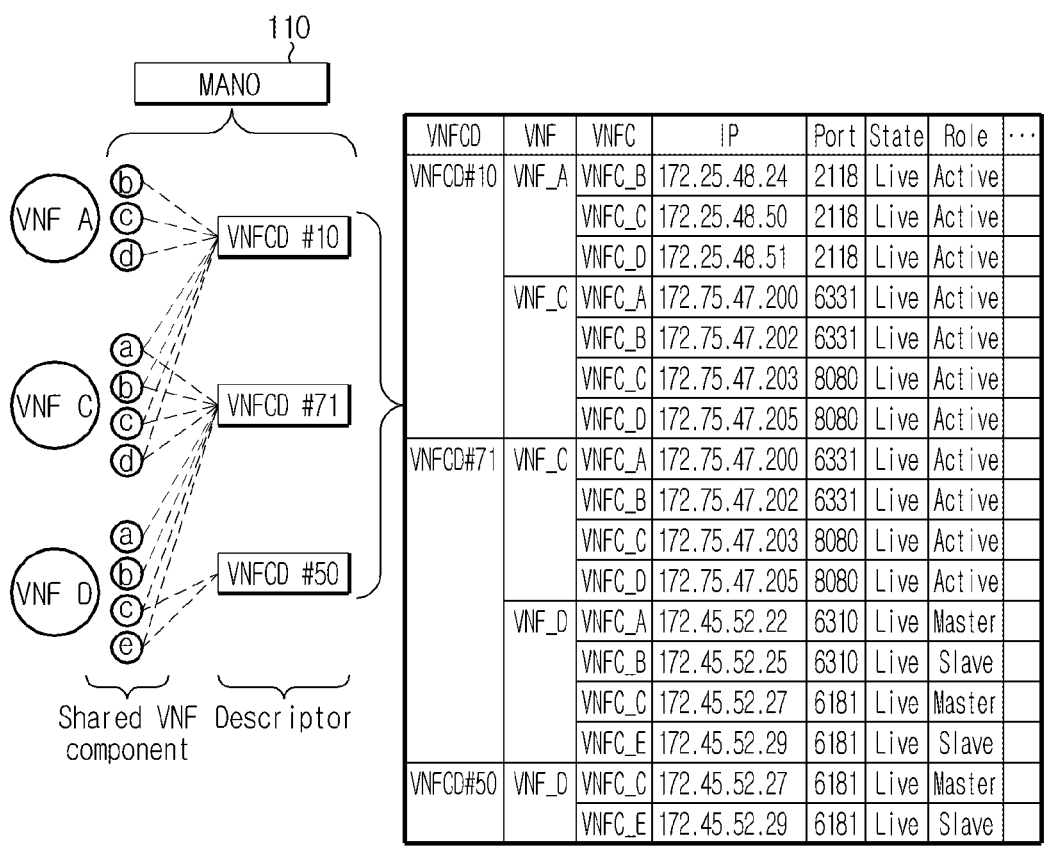
FIG. 3 is a diagram showing that attribute information of two or more shared VNF components is included in a single descriptor according to an exemplary embodiment.

The MANO 110 may generate and manage a descriptor for each VNF component, or may generate and manage a descriptor so that a single descriptor may include attribute information for two or more shared VNF components, depending on the service type. At this time, if the two or more shared VNF components belong to a plurality of VNF instances, a descriptor may be generated for each VNF instance. Referring to FIG. 3 which is explained below, a VNFCD #71 include attribute information of VNF components of a VNF instance C and a VNF instance D, and here, a descriptor including attribute information of shared VNF components a, b, c and d of the VNF instance C and a descriptor including attribute information of shared VNF components a, b, c and e of the VNF instance D may be respectively generated and managed.

FIG. 3 shows attribute information of two or more shared VNF components being included in a single descriptor according to an exemplary embodiment. In FIG. 3, the VNF instance sharing VNF components are VNF A, VNF C, and VNF D. The VNF A shares the VNF components B, C, and D, among the VNF components A to D. The VNF_C shares all of the VNF components A to D. The VNF D shares the VNF components a, b, c and e, among the VNF components A to E.

As shown in FIG. 3, the MANO 110 generates three descriptors, namely VNFCD #10, VNFCD #71, and VNFCD #50. The VNFCD #10 records attribute information of all shared VNF components of the VNF A and the VNF_C. The VNFCD #71 records attribute information of all shared VNF components of the VNF_C and the VNF D. The VNFCD #50 records attribute information of the shared VNF components c and d, among the shared VNF components of the VNF D. As described above, according to an exemplary embodiment, attribute information of two or more shared VNF components may be included in a single descriptor.

The shared VNF components may be grouped based on a predetermined criterion when generating a descriptor. The predetermined criterion may be a service, for example. Referring to FIG. 3, if the VNF instance C provides a map search service and the VNF instance D provides a firm name search service, any peer VNF instance may use only the firm name search service, and any peer VNF instance may use both the firm name search service and the map search service. In this case, for the peer VNF instance which is to use only the firm name search service, a descriptor including attribute information of only shared VNF components of the VNF instance D is generated. Also, for the peer VNF instance which is to use both the firm name search service and the map search service, a descriptor including attribute information of shared VNF components of the VNF instances C and D is generated.

The MANO 110 provides the descriptor to a peer VNF instance which is to use the shared VNF component. The peer VNF instance may be provided with a plurality of descriptors. In addition, a descriptor recording attribute information of the same shared VNF component may be provided to a plurality of peer VNF instances. At this time, the descriptor provided to the peer VNF instance is unique to the corresponding peer VNF instance. In other words, when a descriptor having attribute information of the same shared VNF component is provided to two peer VNF instances, the MANO 110 generates two descriptors distinguishably and then provides the descriptors to peer VNF instances, respectively. At this time, the MANO 110 may allow two descriptors to have identification information different from each other so that the descriptors may be distinguished.

Figure 4:
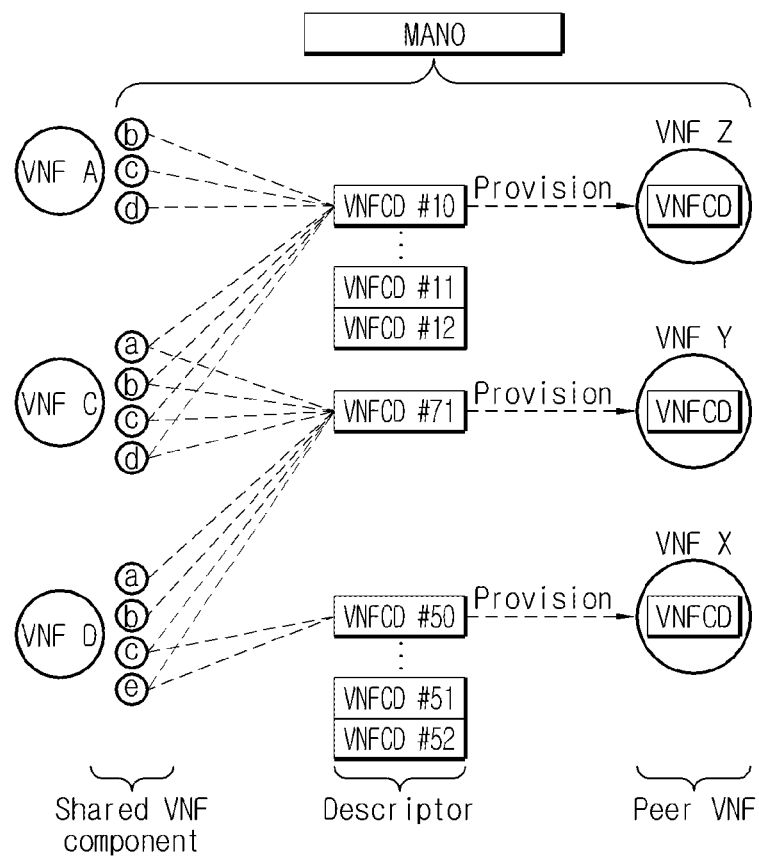
FIG. 4 is a diagram showing that a descriptor is provided to a peer VNF instance according to an exemplary embodiment.
Figure 5:
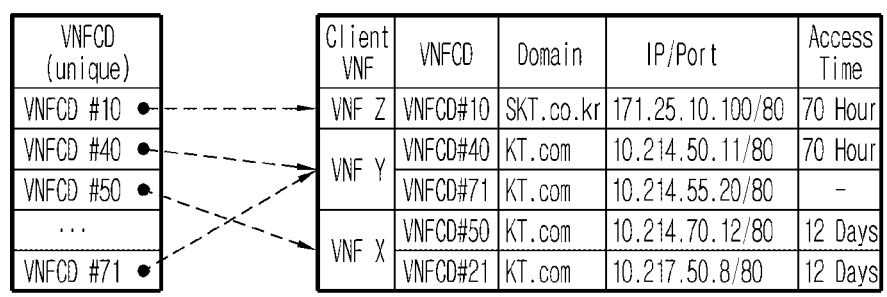
FIG. 5 is a diagram showing a table for managing a peer VNF instance about each descriptor according to an exemplary embodiment.

FIG. 4 is a diagram showing that a descriptor is provided to a peer VNF instance according to an exemplary embodiment, and FIG. 5 is a diagram showing a table for managing a peer VNF instance about each descriptor according to an exemplary embodiment.

Referring to FIG. 4, if a descriptor including attribute information of all shared VNF components of the VNF instance A and the VNF instance C should be provided to three peer VNF instances (Z, Y, X), instead of providing a single descriptor VNFCD #10 to three peer VNF instances, three descriptors, namely VNFCD #10 to #12, are generated inherent to each peer VNF instance and then provided to each peer VNF instance. The descriptors provided to three peer VNF instances are just different in their identification information, but the attribute information of the shared VNF components recorded therein may be identical to each other. In addition, referring to FIG. 5, the peer VNF instance Y is provided with two descriptors, namely VNFCD #40 and VNFCD #71. By doing so, the shared VNF component may be shared by a plurality of peer VNF instances, and the peer VNF instance provided with a plurality of descriptors may share several services.

Meanwhile, when a plurality of descriptors is provided to any one peer VNF instance at the same time, if at least one shared VNF component is overlapped and described in the plurality of descriptors, the MANO 110 provides only a single descriptor to the corresponding peer VNF instance, among the plurality of descriptors. In addition, when a descriptor is provided to any one peer VNF instance and then a new descriptor is provided, if at least one shared VNF component is overlapped in the descriptor which is to be provided newly, the MANO 110 blocks the provision of the descriptor which is to be provided newly.

Referring to FIG. 4, in two descriptors, namely VNFCD #10 and VNFCD #71, the shared VNF component of the VNF instance C is overlapped. Therefore, when providing VNFCD #10 and VNFCD #71 to the peer VNF instance Z, the MANO 110 provides any one of them. Or, if VNFCD #71 is requested in a state where the peer VNF instance Z has already obtained the descriptor VNFCD #10, the MANO 110 does not provide the corresponding descriptor VNFCD #71. The reason that the plurality of descriptors in which a shared VNF component is overlapped is not provided to one peer VNF instance as described above is as follows. If a validity term of a single descriptor expires, the use of shared VNF component recorded in the corresponding descriptor also expires. At this time, if the same shared VNF component is recorded in a remaining descriptor, the expired shared VNF component may be used due to the remaining descriptor, which may unfairly extend the service period.

The MANO 110 generates and provides a descriptor, and then manages a peer VNF instance to which each descriptor is provided. At this time, as shown in FIG. 5, the MANO 110 manages a peer VNF instance for each descriptor in the form of a table. A provision table includes a name of a peer VNF instance provided with a descriptor, identification information of the provided descriptor, a domain, an IP address/port and access time of the corresponding peer VNF instance, or the like. Referring to FIG. 5, for example, the descriptor VNFCD #10 has been provided to a peer VNF instance Z, the corresponding peer VNF instance Z is located at a SKT.CO.KR domain, the IP address is 171.25.10.100, and the port is 80. In addition, the access time is 70 hours.

Figure 6:
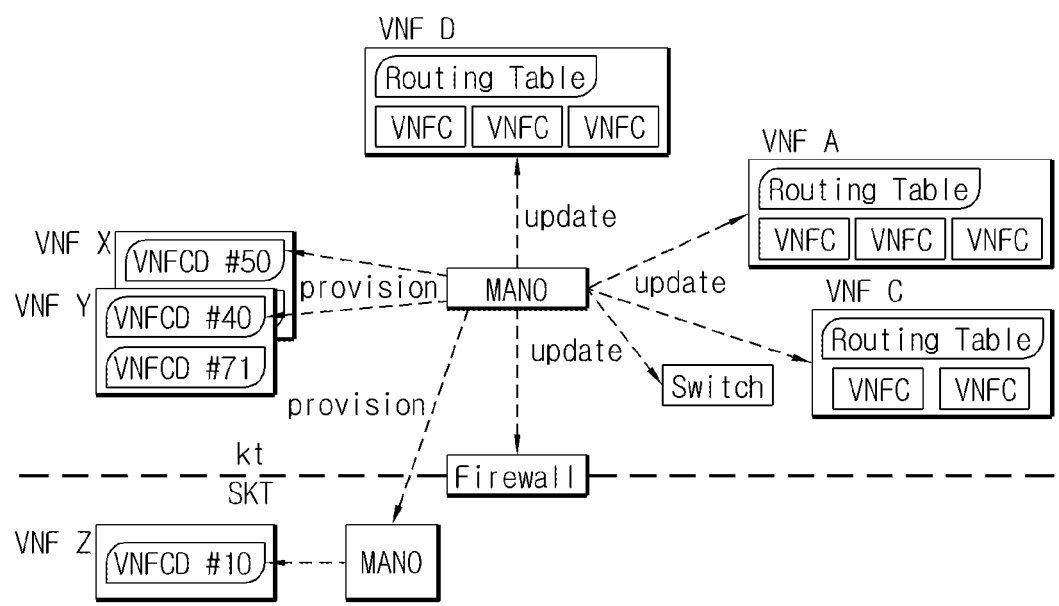
FIG. 6 is a diagram showing a descriptor providing and policy updating process according to an exemplary embodiment.

In addition, after generating and providing a descriptor, the MANO 110 sets access authority such as a routing policy, a firewall policy and a security policy, required for the peer VNF instance to access the shared VNF component. For this, the MANO 110 transmits an update command to a switch, a firewall, a peer VNF instance or the like. FIG. 6 is a diagram showing a descriptor providing and policy updating process according to an embodiment of the present disclosure, and FIG. 6 illustrates a process in which a descriptor is provided similar to the one described with respect to FIG. 5 and a policy is updated accordingly, according to an exemplary embodiment. Referring to FIG. 6, the MANO located at a KT domain "kt" provides a descriptor VNFCD #10 for a peer VNF instance Z to a MANO located at a SKT domain "skt", provides descriptors VNFCD #50 and VNFCD #71 to a peer VNF instance X in the KT domain, and provides descriptors VNFCD #40 and VNFCD #71 to a peer VNF instance Y in the same domain. In addition, in order to allow the peer VNF instances X, Y, Z to access shared VNF components in the VNF instances A, C and D, the MANO in the KT domain transmits an update command for routing information and other access authorities to the firewall, the switch and the VNF instances A, C and D.

In addition, when a logical or physical change, for example scale-in/out, VM migration, an occurrence of a malfunction or the like, is generated at components of a VNF instance having the shared VNF component, the MANO updates a descriptor associated with the corresponding change. For this, the MANO corrects a descriptor stored therein and transmits an update command to a peer VNF instance provided with the descriptor associated with the change.

Figure 7:
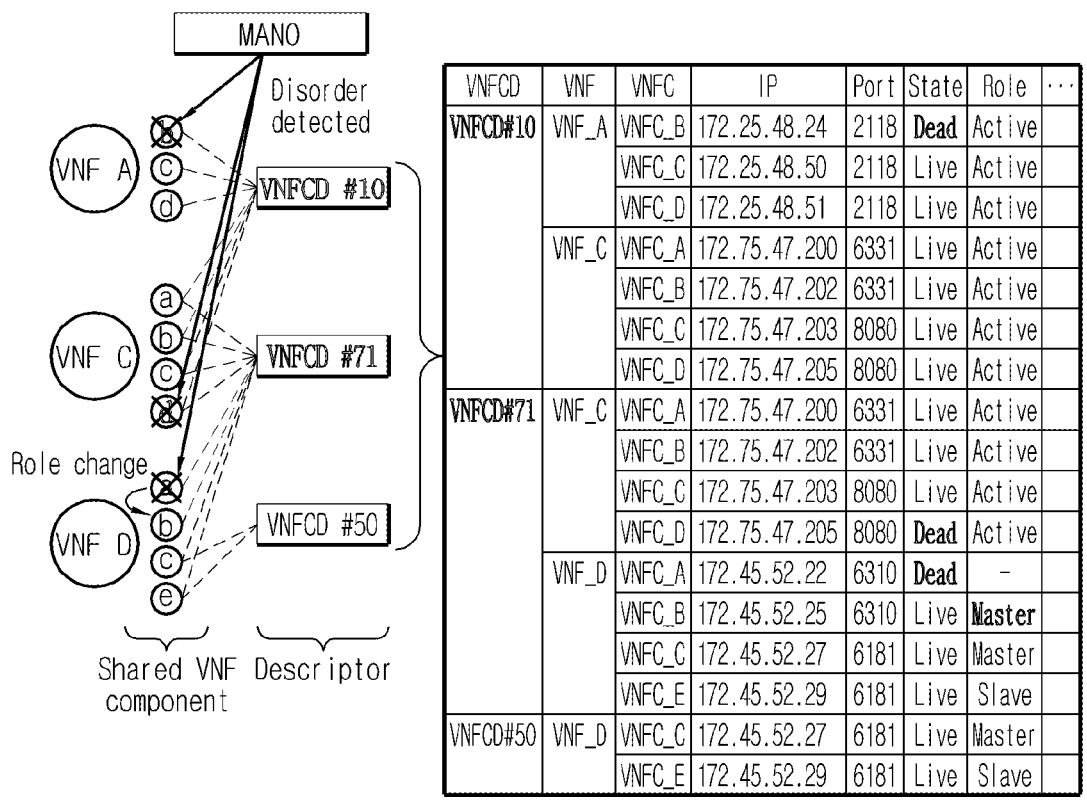
FIG. 7 is a diagram showing a process of updating a descriptor when a shared VNF is changed, according to an exemplary embodiment.

FIG. 7 is a diagram showing a process of updating a descriptor when a shared VNF is changed, according to an exemplary embodiment. Referring to FIG. 7, malfunctions occur at a shared VNF component b in the VNF instance A and a shared VNF component d in the VNF instance C, the shared VNF component a in the VNF instance D is changed into a non-operation state due to the occurrence of a malfunction, and the corresponding shared VNF component a serving as a master is replaced with the shared VNF component b serving as a slave. Therefore, the MANO updates the descriptor VNFCD #10 in which attribute information of the shared VNF component b in the VNF instance A is recorded. In other words, the state of the shared VNF component b recorded in the descriptor VNFCD #10 is changed from 'Live' to "Dead'. In addition, the MANO updates the descriptor VNFCD #71 which records attribute information of a shared VNF component d in the VNF instance C and a shared VNF component a in the VNF instance D. In other words, the state of the shared VNF component d of the VNF instance C and the shared VNF component a of the VNF instance D, recorded in the descriptor VNFCD #71, is changed from 'Live' to "Dead' and changes the role of the shared VNF component b of the VNF instance D from a slave to a master.

Figure 8B:
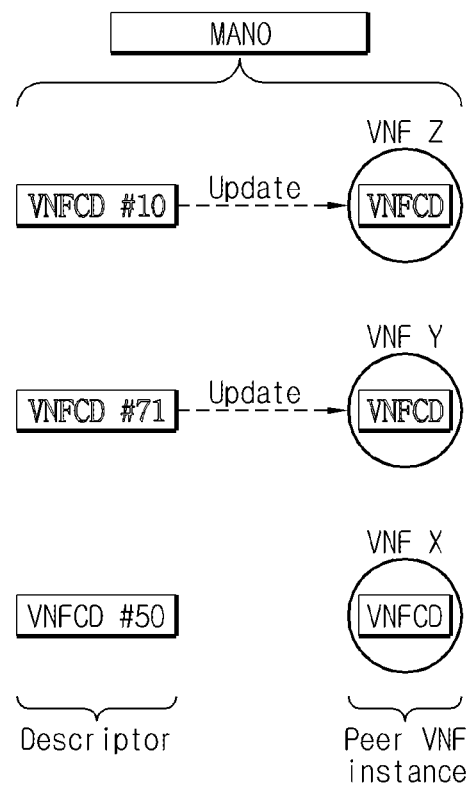

FIGS. 8A and 8B are views showing a process of updating a descriptor in the peer VNF instance according to the change such as the one depicted in FIG. 7, according to an exemplary embodiment. FIG. 8A is a provision table managed by the MANO, where the peer VNF instance provided with the descriptor VNFCD #10 is a VNF instance Z and the peer VNF instance provided with the descriptor VNFCD #71 is a VNF instance Y. Therefore, as shown in FIG. 8B, the MANO transmits an update command for the descriptor to the VNF instance Z and the VNF instance Y.

Meanwhile, the descriptor generated uniquely for each peer VNF instance may be valid only during a period agreed with a provider who has allowed sharing the shared VNF component. The access time recorded in the provision table for example as described above using a validity term. Therefore, the MANO deletes a descriptor whose access time expires, from the provision table, and transmits a delete command to a peer VNF instance provided with the corresponding descriptor. In addition, the MANO also updates the set access authority information, namely a routing policy, a firewall policy, a security policy or the like, according to the expiration of the corresponding descriptor. Therefore, even though the peer VNF instance has an expired descriptor, since the access authority information is changed, the corresponding peer VNF instance is not able to access the shared VNF component any more.

Figure 9B:
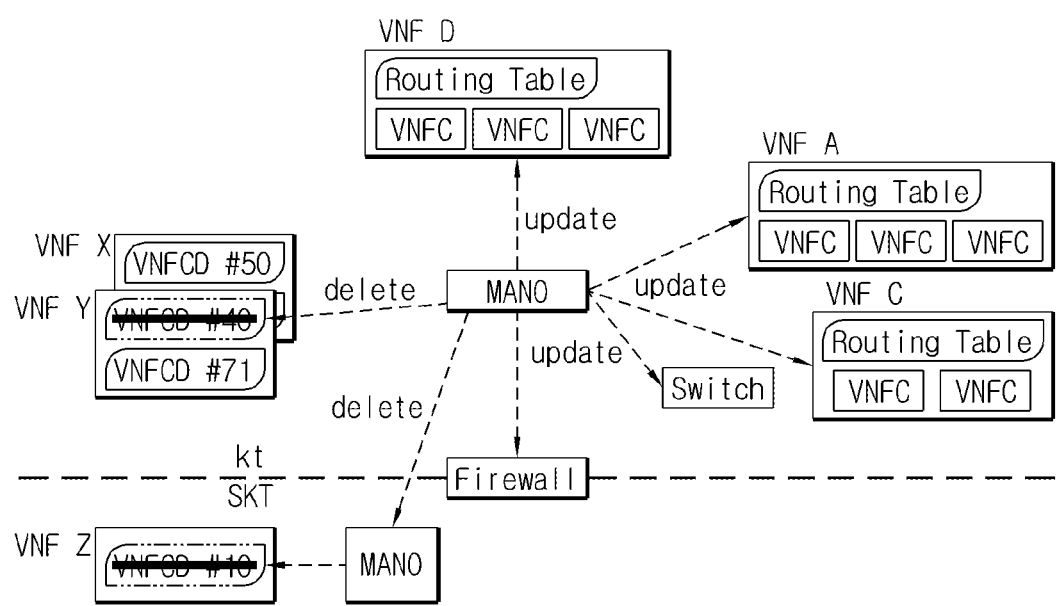

FIGS. 9A and 9B are views showing an update process according to the expiration of an access time of a descriptor according to an exemplary embodiment. FIG. 9A is a provision table managed by the MANO, and the descriptors VNFCD #10 and VNFCD #40 are deleted due to the expiration of access time. The peer VNF instances provided with the descriptors VNFCD #10 and VNFCD #40 are a VNF instance Z and a VNF instance Y. Therefore, as shown in FIG. 9B, in order to delete the descriptor VNFCD #10 provided to a peer VNF instance Z located at another domain, the MANO transmits a delete command for the descriptor VNFCD #10 to a MANO of the domain where the corresponding VNF instance Z is located. In addition, the MANO transmits a delete command for the descriptor VNFCD #40 to the peer VNF instance Y provided with the descriptor VNFCD #40. In addition, the MANO transmits an update command to the firewall, the switch, and the VNF instance A and the VNF instance B having the shared VNF components recorded in the descriptors VNFCD #10 and VNFCD #40 to change the access authority into an original state.

According to an exemplary embodiment described above, when VNF providers share service of their own VNF component with another VNF instance, the service may be easily provided without any separate component such as a load balancer, and thus it is possible to prevent a malfunction from occurring at the entire system when a malfunction occurs at a specific component. In addition, service use range and period may be restricted for each VNF instance using the shared VNF component, a shared service may be operated efficiently. In addition, the VNF instance using a shared VNF component may use service without any consideration about access authority and firewall required for accessing the shared VNF component. In addition, the state of the shared VNF component may be managed in real time and reflected to the entire system, thereby keeping service consistency. In addition, since a shared service is provided to some or all VNF components, it is possible to reduce duplicated development of VNF service, enhance an available rate of equipment, and create a profit to providers according to the provision of the shared service.

The above numerous features may be implemented using software processes specified by command sets recorded in a computer-readable recording medium. When such commands are executed by one or more processing units (for example, a single processor or multi processors), the processing unit performs operations expressed by the commands. The computer-readable recording medium includes, for example, CD-ROM, flash memory, RAM, hard drive, EPROM or the like, without being limited thereto. In exemplary embodiments, the term 'software' may be understood as including firmware residing in a read-only memory or an application stored in a magnetic storage.

Figure 10:
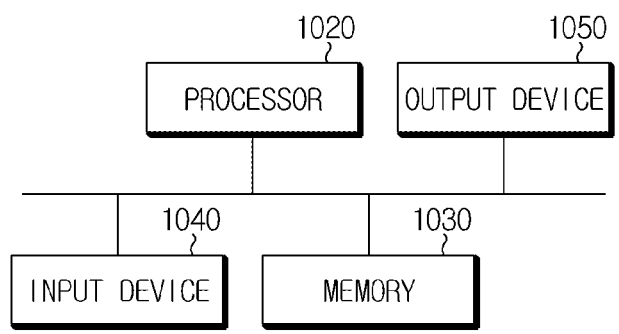
FIG. 10 is a diagram showing an electronic system according to an exemplary embodiment.

FIG. 10 is a diagram showing an electronic system according to an exemplary embodiment. The electronic system may be used for performing operations associated with virtualization and sharing of VNF components. The electronic system may be a computer (for example, a desktop, a tablet, a server, a blade computer or the like), a phone, PDA, or other kinds of electronic devices. The electronic system includes a bus 1010, a processor 1020, a memory 1030, an input device 1040 and an output device 1050.

The bus 1010 connects the processor 1020, the memory 1030, the input device 1040 and the output device 1050.

The processor 1020 is configured to execute program instructions of exemplary embodiments, stored in the memory 1030, and may be a single processor or a multicore processor.

The memory 1030 may store program instructions for executing some exemplary embodiments. The memory 1030 may include a high speed RAM, and may also include one or more magnetic disk storage, a non-volatile memory such as a flash memory, or another non-volatile semiconductor memory. In some exemplary embodiments, the memory 1030 may further include a storage located far from the processor 1020, for example, a network-attached storage accessed through a communication network such as Internet, Intranet, local area network (LAN), wide LAN (WLAN), storage area network (SAN), or suitable combinations thereof.

The input device 1030 allows a user to exchange information with the electronic system and to select a command. The input device 1030 includes a keyboard and a pointer. The output device 1050 displays an image generated by the electronic system. The output device 1050 includes a display device such as a printer, a liquid crystal display (LCD) or a light emitting polymer display (LPD). In some exemplary embodiments, a device such as a touch screen, which may function as both the input device and the output device, may be included.

Figure 11:
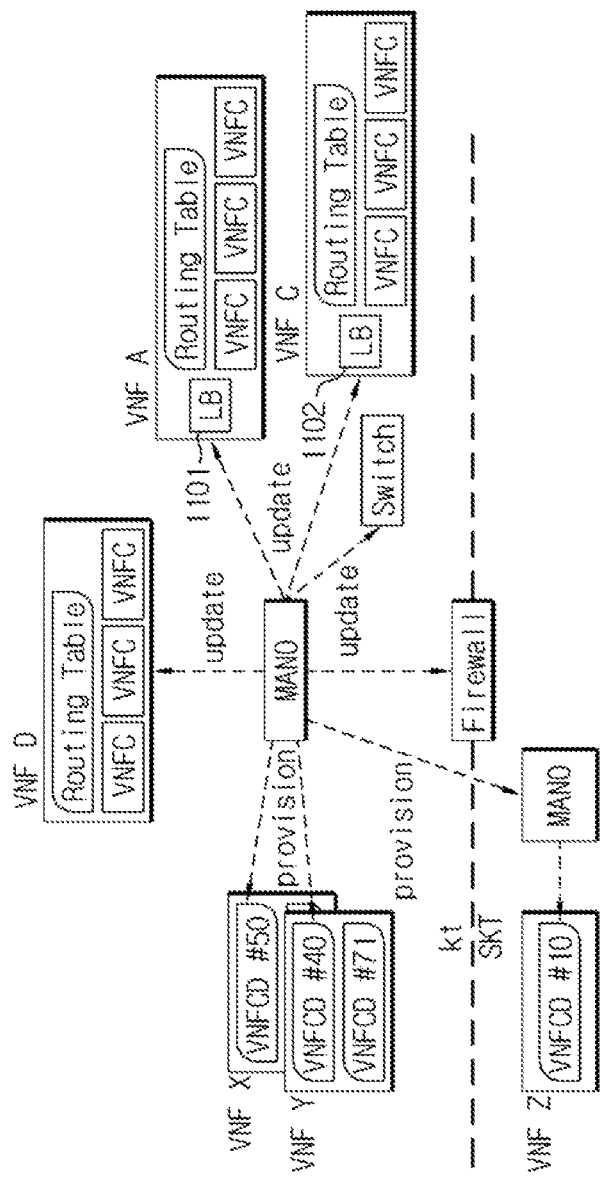
FIG. 11 is a diagram showing a descriptor providing and policy updating process according to yet another exemplary embodiment.
Figure 12:
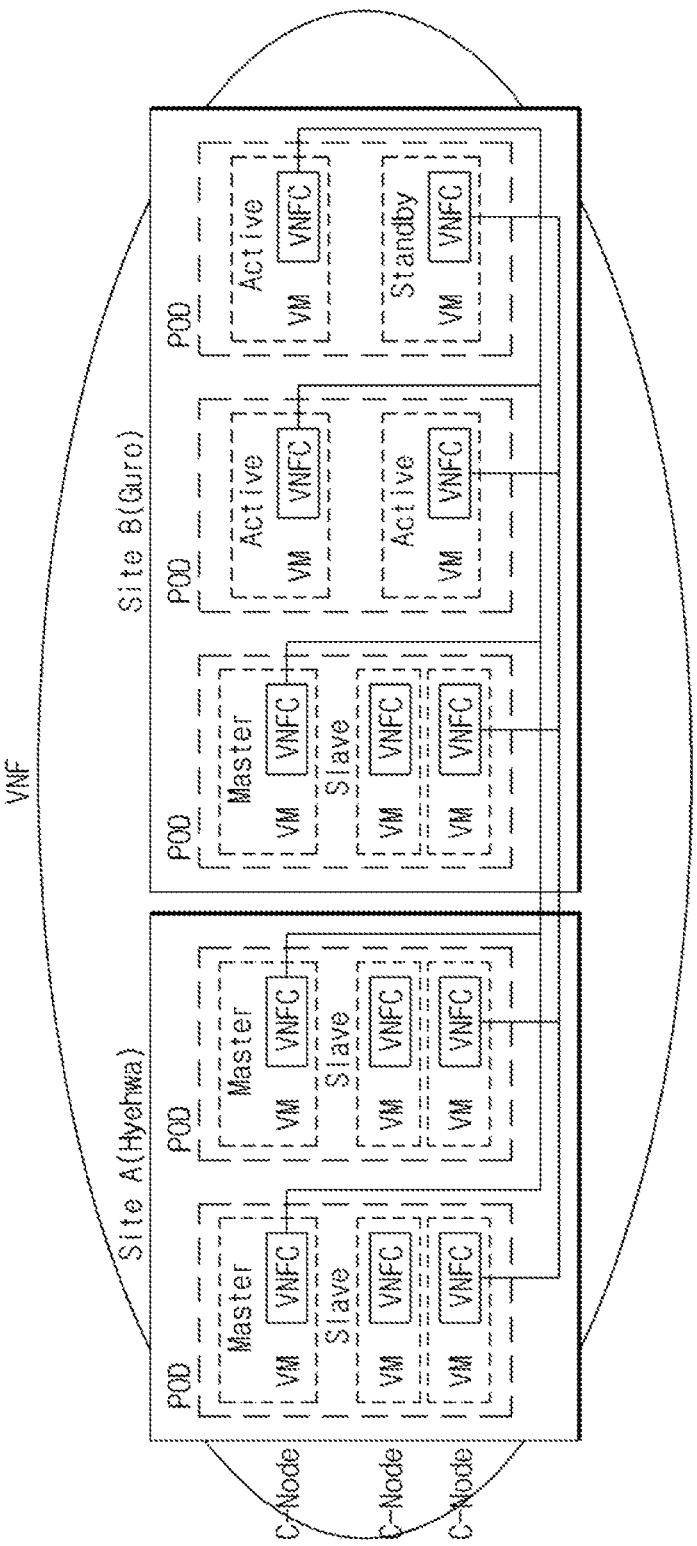
FIG. 12 is a diagram showing an example in which VNF components are physically and geographically distributed according to related art.

FIG. 11 is a diagram showing a descriptor providing and policy updating process according to another exemplary embodiment, and FIG. 11 illustrates a process of providing a descriptor according to the table depicted in FIG. 5 and updating a policy accordingly. As shown in FIG. 11, the VNF instances A and C having the shared VNF component include load balancers (LB) 1101, 1102.

The load balancers 1101, 1102 are a gateway for distributing loads of VNF components or VMs. The load balancers 1101, 1102 may be implemented with VNF components, or physical equipment. The load balancers 1101, 1102 may classify service requests received from peer VNF instances and transmit the service request to a VNF component in charge of processing the service requests. In an existing technique, when a VNF component is shared, peer VNF instances are not able to know logical and physical shapes of each shared VNF component and a state thereof. In an existing technique, the load balancers 1101, 1102 should manage logical and physical identifiers of the shared VNF components and each session state and cope with a change of the shared VNF components and a disorder situation. However, in an exemplary embodiment, since a descriptor including attribute information of shared VNF components is provided to a peer VNF instance under a set access authority and its change is updated in real time, the load balancers 1101, 1102 may minimize the management of logical and physical identifiers of the shared VNF components and each session state. When providing a descriptor to a peer VNF instance, the MANO 110 just transmits an update command for setting an access authority, for example IP address, port, session ID or the like, for the peer VNF instances to the load balancers 1101, 1102 which manage shared VNF components included in the corresponding descriptor to set the access authority. Therefore, even though there is a gateway such as a load balancer, a VNF component sharing service may be provided without increasing a load on the gateway, and thus investment costs for a gateway device for providing the VNF component sharing service may be reduced.

While exemplary embodiments include many features, the features should not be construed as limitations on the scope of the preset disclosure. Certain features described in the context of separate exemplary embodiments can also be implemented in combination. Conversely, various features described in the context of a single exemplary embodiment can also be implemented in multiple exemplary embodiments separately or in any suitable sub-combination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that exemplary embodiments do not require the distinction of various system components made in this description. The program components and systems may be generally implemented as a single software product or multiple software product packages.

Various substitutions, changes, and modifications can be made to exemplary embodiments described above by those having ordinary skill in the art within the scope and spirit of the present disclosure and the present disclosure is not limited to the above exemplary embodiments and the accompanying drawings.

What is claimed is:

1. A method of network function virtualization, the method comprising:
    generating virtual network function (VNF) component descriptor information of at least one shared VNF component, the VNF component descriptor information including an internet protocol (IP) address and port that allows VNF instances to each utilize one or more of the at least one shared VNF component;
    configuring a VNF instance corresponding to one or more physical network functions, the VNF instance being configured with one or more of the at least one shared VNF component, the configuring of the VNF instance including generating VNF instance descriptor information for the VNF instance, the VNF instance descriptor information including attribute information of only shared VNF components of the VNF instance; and
    storing the VNF instance descriptor information in association with a validity term and transmitting the VNF instance descriptor information to a peer VNF instance for using the shared VNF components of the VNF instance, wherein the method further comprises setting at least one of a routing policy, a firewall policy, or a security policy, required for the peer VNF instance to access the shared VNF components of the VNF instance by transmitting an update command to each of a switch, a firewall and the peer VNF instance, and based on the validity term expiring, changing the at least one of the routing policy, the firewall policy, or the security policy, required for the peer VNF instance to access the shared VNF components of the VNF instance by transmitting another update command to each of the switch, the firewall and the peer VNF instance.

2. The method of network function virtualization according to claim 1, wherein VNF component descriptor information is generated for each of the at least one shared VNF component.

3. The method of network function virtualization according to claim 2, wherein the VNF instance descriptor information is unique to the corresponding VNF instance.

4. The method of network function virtualization according to claim 1, wherein attribute information of at least two shared VNF components is stored in a single descriptor.

5. The method of network function virtualization according to claim 4, wherein VNF instance descriptor information is generated for each VNF instance that includes the at least one shared VNF component.

6. The method of network function virtualization according to claim 1, wherein based on determining that a new descriptor for a new VNF instance would overlap with the shared VNF components of the VNF instance, blocking the generation of the new descriptor.

7. The method of network function virtualization according to claim 1, wherein the another update command is a delete command for deleting the corresponding VNF instance descriptor information.

8. The method of network function virtualization according to claim 1, wherein the VNF instance descriptor information of the one or more of the at least one shared VNF component includes at least one of: identification information, role information, state information, authority information, notification information, or session information of the one or more of the at least one shared VNF component.

9. The method of network function virtualization according to claim 1, wherein the at least one shared VNF component includes at least one internal executable software which provides a portion of a service provided by a respective VNF instance.

10. The method of network function virtualization according to claim 1, wherein the VNF instances comprise software supporting various application programs by providing services, and the one or more of the at least one shared VNF component includes at least a portion of the services and is described by the VNF instance descriptor information including at least one of role information or data information.

11. The method of network function virtualization according to claim 1, wherein the VNF component descriptor information is generated only for the at least one shared VNF component.

12. An apparatus of network function virtualization, the apparatus comprising:
  at least one processor; and
  a memory coupled to the at least one processor, wherein the memory stores program code which, when executed by the at least one processor, cause the at least one processor to:
    generate virtual network function (VNF) component descriptor information of at least one shared VNF component, the VNF component descriptor information including an internet protocol (IP) address and port that allows VNF instances to each utilize one or more of the at least one shared VNF component;
    configure a VNF instance corresponding to one or more physical network functions, the VNF instance being configured with one or more of the at least one shared VNF component, the configuring of the VNF instance including generating VNF instance descriptor information for the VNF instance, the VNF instance descriptor information including attribute information of only shared VNF components of the VNF instance; and
    store the VNF instance descriptor information in association with a validity term and transmit the VNF instance descriptor information to a peer VNF instance for using the shared VNF components of the VNF instance, wherein the program code, when executed by the at least one processor, further causes the at least one processor to: set at least one of a routing policy, a firewall policy, or a security policy, required for the peer VNF instance to access the shared VNF components of the VNF instance by transmitting an update command to each of a switch, a firewall and the peer VNF instance, and based on the validity term expiring, change the at least one of the routing policy, the firewall policy, or the security policy, required for the peer VNF instance to access the shared VNF components of the VNF instance by transmitting another update command to each of the switch, the firewall and the peer VNF instance.

13. The apparatus of network function virtualization according to claim 12, wherein the program instructions are executable to generate the VNF component descriptor information for each of the at least one shared VNF component.

14. The apparatus of network function virtualization according to claim 13, wherein the VNF instance descriptor information is unique to the corresponding VNF instance.

15. The apparatus of network function virtualization according to claim 12, wherein the program instructions are executable to generate the VNF instance descriptor information to comprise attribute information of at least two shared VNF components in a single descriptor.

16. The apparatus of network function virtualization according to claim 15, wherein the program instructions are executable to generate the VNF instance descriptor information for each VNF instance including the one of the at least one shared VNF component.

17. The apparatus of network function virtualization according to claim 12, wherein based on determining that a new descriptor of a new VNF instance that a new descriptor for a new VNF instance would overlap with the shared VNF components of the VNF instance, block the generation of the new descriptor.

18. The apparatus of network function virtualization according to claim 12, wherein the another update command is a delete command for deleting the corresponding VNF instance descriptor information.

19. A system of network function virtualization, the system comprising:
  a gateway configured to manage access by at least one peer virtual network function (VNF) VNF instance to one or more of the at least one shared VNF component;
  an apparatus configured to:
    generate virtual network function (VNF) component descriptor information of the at least one shared VNF component, the VNF component descriptor information including an internet protocol (IP) address and port that allows VNF instances to each utilize one or more of the at least one shared VNF component;
    configure a VNF instance corresponding to one or more physical network functions, the VNF instance being configured with one or more of the at least one shared VNF component, the configuring of the VNF instance including generating VNF instance descriptor information for the VNF instance, the VNF instance descriptor information including attribute information of only shared VNF components of the VNF instance; and
    store the VNF instance descriptor information in association with a validity term and transmit the VNF instance descriptor information to a peer VNF instance for using the shared VNF components of the VNF instance, wherein the apparatus is further configured to: set at least one of a routing policy, a firewall policy, or a security policy, required for the peer VNF instance to access the shared VNF components of the VNF instance by transmitting an update command to each of a switch, a firewall and the peer VNF instance, and based on the validity term expiring, change the at least one of the routing policy, the firewall policy, or the security policy, required for the peer VNF instance to access the shared VNF components of the VNF instance by transmitting another update command to each of the switch, the firewall and the peer VNF instance.

20. The system of network function virtualization according to claim 19, wherein the apparatus is further configured to generate the VNF component descriptor information for each of the at least one shared VNF component.

21. The system of network function virtualization according to claim 19, wherein the apparatus is further configured to generate a single descriptor comprising attribute information of at least two shared VNF components.

22. The system of network function virtualization according to claim 21, wherein the apparatus is further configured to generate the VNF instance descriptor information for each VNF instance comprising the one of the at least one shared VNF component.

23. The system of network function virtualization according to claim 19, wherein the gateway is implemented in the VNF instance configured to utilize the one or more of the at least one shared VNF component.

* * * * *